(12) United States Patent
Diab et al.

(10) Patent No.: US 8,791,604 B2
(45) Date of Patent: Jul. 29, 2014

(54) METHOD AND SYSTEM FOR A CONNECTION SYSTEM OPERABLE TO SINK AND SOURCE SUPPLY POWER

(75) Inventors: Wael William Diab, San Francisco, CA (US); Michael Johas Teener, Santa Cruz, CA (US)

(73) Assignee: Broadcom Corporation, Irvine, CA (US)

(*) Notice: Subject to any disclaimer, the term of this patent is extended or adjusted under 35 U.S.C. 154(b) by 450 days.

(21) Appl. No.: 12/828,484

(22) Filed: Jul. 1, 2010

(65) Prior Publication Data
US 2011/0181125 A1 Jul. 28, 2011

Related U.S. Application Data (60) Provisional application No. 61/309,686, filed on Mar. 2, 2010, provisional application No. 61/298,076, filed on Jan. 25, 2010, provisional application No. 61/321,333, filed on Apr. 6, 2010, provisional application No. 61/298,082, filed on Jan. 25, 2010, provisional application No. 61/307,246, filed on Feb. 23, 2010, provisional application No. 61/309,603, filed on Mar. 2, 2010.

(51) Int. Cl.
*H01H 27/00* (2006.01)
*H04Q 3/00* (2006.01)

(52) U.S. Cl.
CPC ...................................... *H04Q 3/00* (2013.01)
USPC ............................ 307/130; 307/116; 307/125

(58) Field of Classification Search
CPC ......................................................... H04Q 3/00
USPC ......................................... 307/116, 125, 130
See application file for complete search history.

(56) References Cited

U.S. PATENT DOCUMENTS 5,577,023 A * 11/1996 Marum et al. ................. 370/225
5,772,466 A * 6/1998 Morin et al. ................... 439/489
(Continued)

FOREIGN PATENT DOCUMENTS

| CN | 101106459 A | 1/2008 |
|---|---|---|
| CN | 101741682 A | 6/2010 |
| JP | 2008-5593 | 1/2008 |

OTHER PUBLICATIONS

English Abstract for Japanese Patent Publication No. JP 2008-5593, published Jan. 10, 2008, 2 pages.
U.S. Appl. No. 61/309,686, filed Mar. 2, 2010.
U.S. Appl. No. 61/298,076, filed Mar. 31, 2010.

(Continued)

*Primary Examiner* — Adi Amrany
(74) *Attorney, Agent, or Firm* — Sterne, Kessler, Goldstein & Fox PLLC (57) ABSTRACT

Aspects of a method and system for a connection system operable to sink and source supply power are provided. In this regard, one or more circuits within a connector that resides in a networking enabled device may be operable to determine whether the networking enabled device is to operate as a powered device or as a power supplying device. Based on a result of the determination, the one or more circuits may be operable to couple power pins of the connector to either a first power rail of the networking enabled device or a second power rail of the networking enabled device. The determination of whether the networking enabled device is to operate as a powered device or as a power supplying device may be based on a voltage on a sense pin of the connector and/or based on mechanical characteristics of the connector.

20 Claims, 9 Drawing Sheets

(56) References Cited

U.S. PATENT DOCUMENTS

| | | | |
|---|---|---|---|
| 5,923,663 A * | 7/1999 | Bontemps et al. | 370/445 |
| 6,175,865 B1 * | 1/2001 | Dove et al. | 709/220 |
| 6,661,805 B1 * | 12/2003 | Romano et al. | 370/450 |
| 7,340,511 B2 * | 3/2008 | Dove | 709/220 |
| 7,366,771 B2 * | 4/2008 | Dove | 709/220 |
| 7,500,116 B2 * | 3/2009 | Camagna et al. | 713/300 |
| 7,543,044 B2 * | 6/2009 | Yen et al. | 709/220 |
| 7,788,518 B2 * | 8/2010 | Biederman et al. | 713/340 |
| 7,793,137 B2 * | 9/2010 | Karam et al. | 714/4.12 |
| 7,996,575 B2 * | 8/2011 | Hall et al. | 710/8 |
| 2002/0190700 A1 | 12/2002 | Tzotzkov | |
| 2005/0152306 A1 * | 7/2005 | Bonnassieux et al. | 370/328 |
| 2008/0133945 A1 * | 6/2008 | Biederman et al. | 713/300 |
| 2011/0183546 A1 | 7/2011 | Diab et al. | |
| 2011/0185097 A1 | 7/2011 | Diab | |
| 2011/0206063 A1 | 8/2011 | Diab | |
| 2011/0217873 A1 | 9/2011 | Diab et al. | |
| 2011/0219147 A1 | 9/2011 | Diab | |
| 2011/0234002 A1 * | 9/2011 | Hiscock et al. | 307/32 |

OTHER PUBLICATIONS

U.S. Appl. No. 61/321,333, filed Apr. 6, 2010.
U.S. Appl. No. 61/785,102, filed May 21, 2010.
U.S. Appl. No. 61/298,082, filed Jan. 25, 2010.
U.S. Appl. No. 61/307,246, filed Feb. 23, 2010.
U.S. Appl. No. 61/309,603, filed Mar. 2, 2010.
Chinese language office action received in counterpart Chinese Application No. 201110183352.1, mailed Jul. 17, 2013 from the Chinese Patent Office; 7 pages.
Chinese language office action received in counterpart Taiwanese Application No. 100123162, mailed Feb. 18, 2014 from the Taiwanese Patent Office; 4 pages.
English language abstract of CN 101106459 A, Thomson Innovation, http://www.thomsoninnovation.com, accessed Mar. 11, 2014, listed as document FP1 on the accompanying form PTO/SB/08A; 5 pages.
English language abstract of CN 101741682 A, Thomson Innovation, http://www.thomsoninnovation.com, accessed Mar. 11, 2014, listed as document FP2 on the accompanying form PTO/SB/08A; 5 pages.

* cited by examiner

FIG. 7

METHOD AND SYSTEM FOR A CONNECTION SYSTEM OPERABLE TO SINK AND SOURCE SUPPLY POWER

INCORPORATION BY REFERENCE

This patent application makes reference to:
U.S. Provisional Patent Application Ser. No. 61/309,686 which was filed on Mar. 2, 2010;
U.S. patent application Ser. No. 12/752,065 which was filed on Mar. 31, 2010;
U.S. Provisional Patent Application Ser. No. 61/298,076 which was filed on Jan. 25, 2010;
U.S. patent application Ser. No. 12/702,173 which was filed on Feb. 8, 2010;
U.S. Provisional Patent Application Ser. No. 61/321,333 which was filed on Apr. 6, 2010;
U.S. Provisional patent application Ser. No. 12/785,102 which was filed on May 21, 2010;
U.S. Provisional Patent Application Ser. No. 61/298,082 which was filed on Jan. 25, 2010;
U.S. patent application Ser. No. 12/701,381 which was filed on Feb. 5, 2010;
U.S. Provisional Patent Application Ser. No. 61/307,246 which was filed on Feb. 23, 2010;
U.S. patent application Ser. No. 12/731,908 which as filed on Mar. 25, 2010;
U.S. Provisional Patent Application Ser. No. 61/309, 603 which was filed on Mar. 2, 2010; and
U.S. patent application Ser. No. 12/731,933 which was filed on Mar. 25, 2010;

Each of the above stated applications is hereby incorporated herein by reference in its entirety.

FIELD OF THE INVENTION

Certain embodiments of the invention relate to electronic devices. More specifically, certain embodiments of the invention relate to a method and system for a connection system operable to sink and source supply power.

BACKGROUND OF THE INVENTION

Communication devices may incorporate a plurality of features, for example, a mobile phone, a digital camera, an Internet browser, a gaming device, a Bluetooth headphone interface and/or a location device. In this regard, the communication devices may be operable to communicate via a plurality of wire-line and/or wireless networks such as local area networks, wide area networks, wireless local area networks, cellular networks and wireless personal area networks, for example. In this regard, endpoint devices may communicate via various wireless and/or wire-line switches, routers, hubs, access points and/or base stations.

Many communication devices may communicate via twisted pair cables which may comprise pairs of copper wire that are twisted together. Various numbers of twists or turns in the wire pairs may enable mitigation of common mode electromagnetic interference. Twisted pair cabling may be shielded and/or unshielded. Shielding may comprise a conductive material that may enable grounding of the cable. A grounding wire may be also be utilized for grounding twisted pair cabling. The shielding may enclose a single pair of twisted wires and/or may enclose a plurality of pairs. The shielding may comprise foil and/or a braided sheath, for example. In this regard, the shielding may mitigate cross talk between twisted pairs and/or between a plurality of cables.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a connection system operable to sink and source supply power, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a connection system operable to sink and source supply power. In various embodiments of the invention, one or more circuits within a connector that resides in a networking enabled device may be operable to determine whether the networking enabled device is to operate as a powered device or as a power supplying device. Based on a result of the determination, the one or more circuits may be operable to couple power pins of the connector to either a first power rail of the networking enabled device or a second power rail of the networking enabled device. The determination of whether the networking enabled device is to operate as a powered device or as a power supplying device may be based on a voltage on a sense pin of the connector. The determination of whether the networking enabled device is to operate as a powered device or as a power supplying device may be based on mechanical characteristics of the connector. The connector may comprise one or more first interfaces that enable electrically coupling the connector to the cable, one or more second interfaces that enable electrically coupling the connector to the networking enabled device, and one or more third interfaces that enable electrically coupling the connector to another connector that is mounted on or within the device. The one or more circuits may be positioned so that they may reside on the connector. In this regard, the one or more circuits are part of the connector and are not part of an external device.

The networking enabled device may comprise a plurality of the connectors and each one of the connectors may be configured independent of a configuration of remaining ones of the connectors. The networking enabled device may be operable to receive power via a plurality of the connectors concurrently. The networking enabled device may be operable to sink power via one or more of the plurality of connectors while concurrently sourcing power via one or more of the plurality of connectors. The networking enabled device may be operable to communicate in adherence with Ethernet protocols via the connector. The networking enabled device may be operable to determine a power available via the connector. The networking enabled device may comprise a battery that may be charged utilizing supply power received via the connector.

Figure 1A:
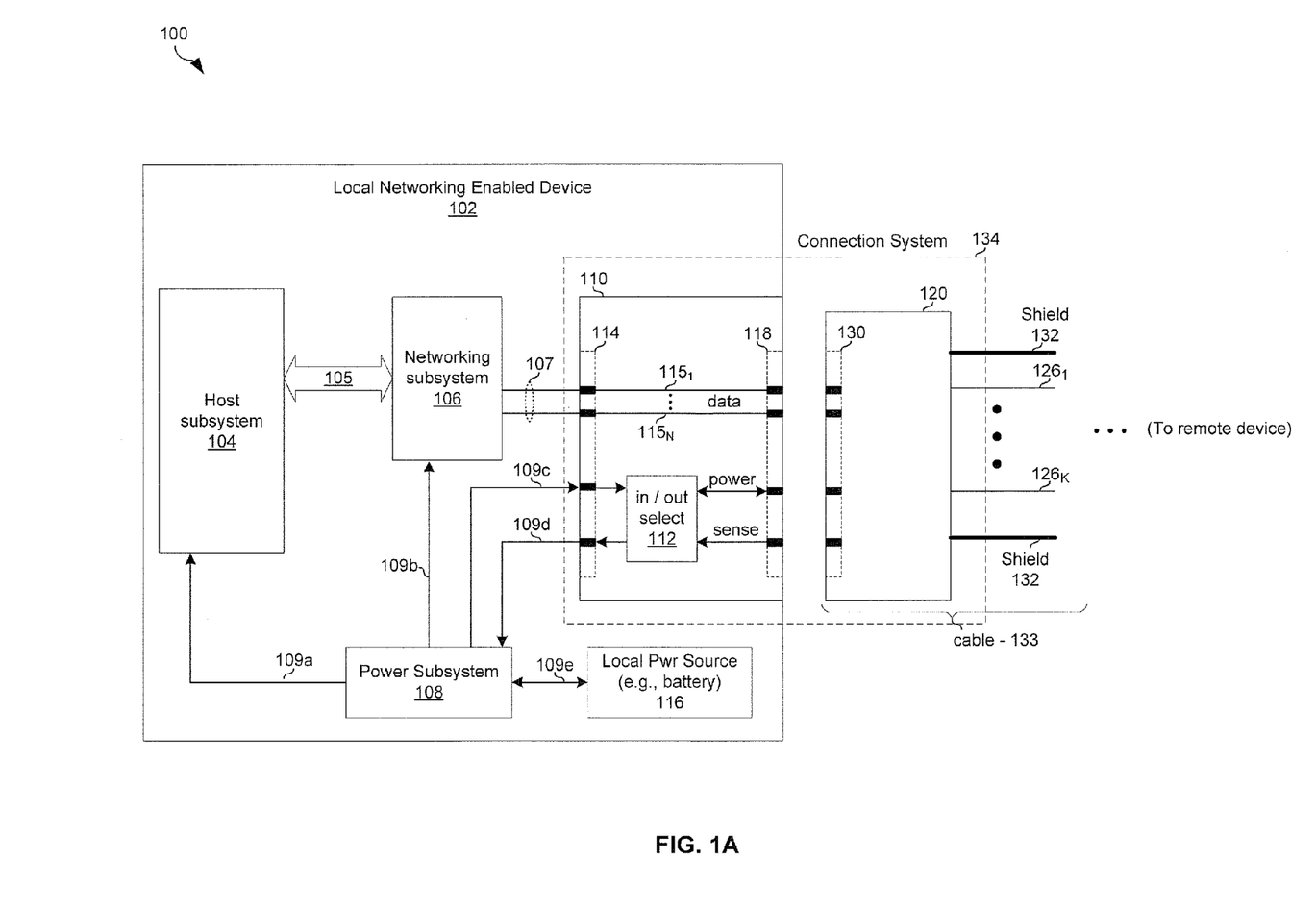
FIG. 1A is a block diagram illustrating an exemplary network device comprising a connector via which supply power may be sourced and sinked, in accordance with an embodiment of the invention.

FIG. 1 is a block diagram illustrating an exemplary network device comprising a connector via which supply power may be sourced and sinked, in accordance with an embodiment of the invention. A device that sources supply power may output supply power to other devices. A device that sinks supply power may receive power from another device. Referring to FIG. 1, there is shown a networking enabled device 102 and a connection system 134. The networking enabled device 102 may comprise a host subsystem 104, a networking subsystem 106, and a connector 110. The connection system 134 may comprise the connector 110, a cable 133, and another connector (not shown) or termination on a link partner (not shown). The cable 133 may comprise the connector 120, one or more conductors 126, and one or more connectors or other terminations (not shown) on the opposite end of the cable 133. Notwithstanding, a cable need not be limited to such an embodiment. For example, a cable may be as simple as a single conductor, such as a copper wire.

The term "connector" is used generically herein to encompass both receptacles and plugs. In this regard, whether a connector is a receptacle that accepts a plug or whether a connector is a plug that inserts into a receptacle may be implementation dependant and unimportant in various embodiments of the invention. Also, as used herein, "supply power" is distinguished from "signal power," where the former refers to power from which an electronic device operates and the latter is power delivered as part of a signaling operation.

The networking enabled device 102 may comprise suitable logic, circuitry, interfaces and/or code that may be operable to perform computing and/or networking functions. An exemplary networking enabled device 102 may comprise a router, a switch, a patch panel, a laptop, a portable phone, a media player, a location device, a television, a set-top-box, a camera and/or a gaming device. The networking enabled device 102 may be operable to communicate via the connection system 134 based on a plurality of different standardized and/or non-standardized communication protocols and/or communication technologies, for example, based on various Ethernet protocols.

The host subsystem 104 may comprise suitable logic, circuitry, interfaces, and/or code that may be operable to perform computations and/or execute instructions in the networking enabled device 102. For example the host subsystem 104 may comprise one or more state machines and/or may run an operating system. The host subsystem 104 may perform computations and/or execute instructions to generate messages for transmission via the networking subsystem 106. The host subsystem 104 may perform computations and/or execute instructions to process messages received via the networking subsystem 106. The host subsystem 104 may interface with the networking subsystem 106 via a data bus 105 which may be, for example, a PCI-X bus.

The networking subsystem 106 may comprise suitable logic, circuitry, interfaces, and/or code that may be operable to handle functionality of OSI layer 1 and higher OSI layers in the networking enabled device 102, respectively. The networking subsystem 106 may be operable to implement switching, routing, and/or network interface card (NIC) functions. The networking subsystem 106 may be operable to implement Ethernet protocols, such as those based on the IEEE 802.3 standard, for example, but is not limited in this regard. The networking subsystem 106 may comprise, for example, a media access control (MAC) controller and an Ethernet enabled PHY.

The power subsystem 108 may comprise suitable logic, circuitry, interfaces, and/or code that may be operable receive, generate, condition, and/or otherwise process supply power. The power subsystem 108 may output supply power to the host subsystem 104 via one or more power rails 109*a*, to the networking subsystem 106 via one or more power rails 109*b*, and to the connector 110 via one or more power rails 109*c*. The power subsystem 108 may be operable to receive supply power from the connector 110 via the power rail 109*d*. Supply power supplied by the power subsystem 108 to another device, via the connector 110, may be sourced from the local power source 116. The local power source 116 may comprise, for example, a battery or a connection to a power outlet. In instances that the local power source 116 is a battery, the power subsystem 108 may be operable charge the battery with supply power drawn from a remote device via the connector 110.

The power subsystem 108 may be configured utilizing one or more parameters. Exemplary configurable parameters for the power subsystem 108 comprise one or more resistances, capacitances, and/or inductances; a switching frequency of a DC-DC converter in the power subsystem 108; an output current and/or a voltage of one or more of the power rails 109*a*, 109*b*, and/or 109*c*, and a current drawn via the power rails 109*d* and/or 109*e*. In various embodiments of the invention, the power subsystem 108 may be operable to measure supply power provided and/or drawn and such measurements may be utilized to manage the supply power.

The connection system 134 may be operable to support communication based on a plurality of standardized and/or non-standardized communication protocols and/or technologies. The connector 110 may be operable to couple to cables comprising various features. For example, cables of various lengths, cables with or without shielding 132, and/or cables comprising various categories of cabling, such as cat 3, 5, 5e, 6, 6a, 7, or 7a, may be coupled to the connector 110. Moreover, various components of the connection system 134 may comply with one or more structured cabling standards, for example, ISO/IEC and/or TIA standards. When the connector 120 is coupled to the connector 110, the networking enabled device 102 may be operable to determine characteristics of the connection system 134, including, but not limited to, whether shielding 132 is present. In this regard, one or more of the connector 120, the network subsystem 106, and/or the host subsystem 104 may, autonomously or cooperatively, determine the characteristics of the connector 120, the connector 110, the conductor(s) 126, and/or shielding 132. The characteristics of the connection system 134 may be utilized to determine a data rate at which to communicate via the connection system 134 and/or determine how to allocate or otherwise manage supply power provided via the connection system 134.

The connection system 134 may comply with standardized and/or non-standard specifications. For example, the connector 110 and the connector 120 may be compatible with Ethernet standards. Also, the connector 110 may be small enough to fit into a handheld device and/or small enough to enable greater than 48 receptacles and/or plugs to fit into a one-rack-unit face plate of a 19-rack rack. Furthermore, in various embodiments of the invention, the connection system 134 may comprise a plurality of connectors such as the connector 110 that may be coupled or "ganged" together.

The connector 110 may comprise an internal interface 114 comprising one or more contacts or pins via which the connector 110 may be electrically coupled to the local device 102. The connector 110 may comprise an external interface 118 comprising one or more contacts or pins via which the connector 110 may be electrically coupled to the cable 133. The connector 110 may comprise a module 112 that may be operable to configure the connector 110 based on whether the device 102 sources or sinks supply power via the connector 110. Although not shown for simplicity of illustration, the connector 110 may also comprise magnetics, a non-volatile memory (NVM), one or more light emitting diodes (LEDs), and/or a physical layer transceiver (PHY). In this regard, the connector 110 may be of a modular design and whether various elements are populated in it may depend on, for example, whether the networking device 102 will only source supply power via the connector 110 or will only sink supply power via the connector 110. In this manner, by populating or not populating various elements within and/or on the connector 110, different variants of the connector 110 may be manufactured for different use cases.

The connector 110 may be coupled to the connector 120 for communication of data and/or delivery of supply power over the cable 133. For example, the connector 120 may be inserted into the connector 110 and may be held in place via either friction retention and/or via a positive retention mechanism such as a latch or screw. The connector 110 may be configurable or may be dedicated for a specific function. For example, the connector 110 may be a service port that may enable management of the communication device 102. In another exemplary embodiment of the invention, the connector 110 may be utilized for data communication. Furthermore, the connector 110 may be configurable for wireless communication, for example, the connector 110 may function as an antenna port. The connector 110 may be multifunctional where a plurality of types of communication may operate concurrently. In various embodiments of the invention, the connector may be keyed or comprise some other mechanical means for ensuring the connector 120 is inserted correctly, to ensure that only compatible connectors may be inserted into the connector 110, and/or to identify whether an attached devices sources or sinks supply power.

In various embodiments of the invention, the networking enabled device 102 may be operable to implement one or more energy efficient networking techniques, which may be referred to as energy efficient networking (EEN) or, in the specific case of Ethernet, energy efficient Ethernet (EEE). For example, the networking enabled device 102 may be operable to support low power idle (LPI) and/or sub-rating, also referred to as subset PHY, techniques. Low power idle may generally refer a family of techniques where, instead of transmitting conventional IDLE symbols during periods of inactivity, devices may remain silent and/or communicate signals other than conventional IDLE symbols. Sub-rating, or sub-set PHY, may generally refer to a family of techniques where the PHYs are reconfigurable, in real-time or near real-time, to communicate at different data rates.

Utilizing one or more EEN techniques such as sub-rating and LPI, the networking enabled device 102 may be configured to operate in various modes of operation, where power consumption of the networking enabled device 102 may vary based on the mode of operation. In this regard, an EEN control policy may determine how to configure and/or reconfigure various portions of the networking enabled device 102 to optimize the tradeoff between energy consumption and performance. In an exemplary embodiment of the invention, the device 102 may be configured based on whether and/or how much supply power is being received or supplied via the connector 110, and an amount of supply power available from the local power source 116. In an exemplary embodiment of the invention, a lower power configuration may be selected in instances that the local power source 116 is a battery versus instances that the local power source 116 is a connection to a power outlet. In an exemplary embodiment of the invention, a lower power configuration may be selected in instances that the supply power is being received via the connector 110 versus instances that supply power is being supplied to another device via the connector 110.

Configuring the mode of operation of the device 102 may comprise variety of decisions. For LPI, for example, the EEN control policy may determine what variant of LPI to utilize, when to go into an LPI mode, and when to come out of an LPI mode. For subset PHY, for example, the EEN control policy may determine how to achieve a desired data rate and when to transition between data rates. The energy efficient techniques and/or the EEN control policy may be implemented via logic, circuitry, interfaces, and/or code that may be implemented in the host subsystem 104, the networking subsystem 106, the power subsystem 108, or a combination thereof.

The connector 120 may be coupled to the connector 110 and/or the optional shield 132. Upon mating of the connector 120 to the connector 110, pins of the interface 118 may be in conductive contact with pins of the interface 130.

The conductor(s) 126 may comprise, for example, aluminum or copper wire and may form one or more twisted pairs. In various embodiments of the invention, some of the conductors 126 may carry data and some may carry supply power. Characteristics of the cable 133, such as number of twisted pairs within the cable 133, number of conductors 126 that carry supply power, presence of shielding 132, length of the cable 133, and/or wire gauge used for the conductors 126 may determine which protocols and/or which data rates may be supported by the cable 133. The optional shield 132 may comprise, for example, foil and/or a braided sheath around and/or along a length of one or more twisted pairs. For example, one or more individual twisted pairs may be shielded via one or more corresponding shields 132, and/or a plurality of twisted pairs may be encased in a single shield 132. The optional shield 132 may be grounded by the networking enabled device 102 via the connector 110, for example.

Figure 1B:
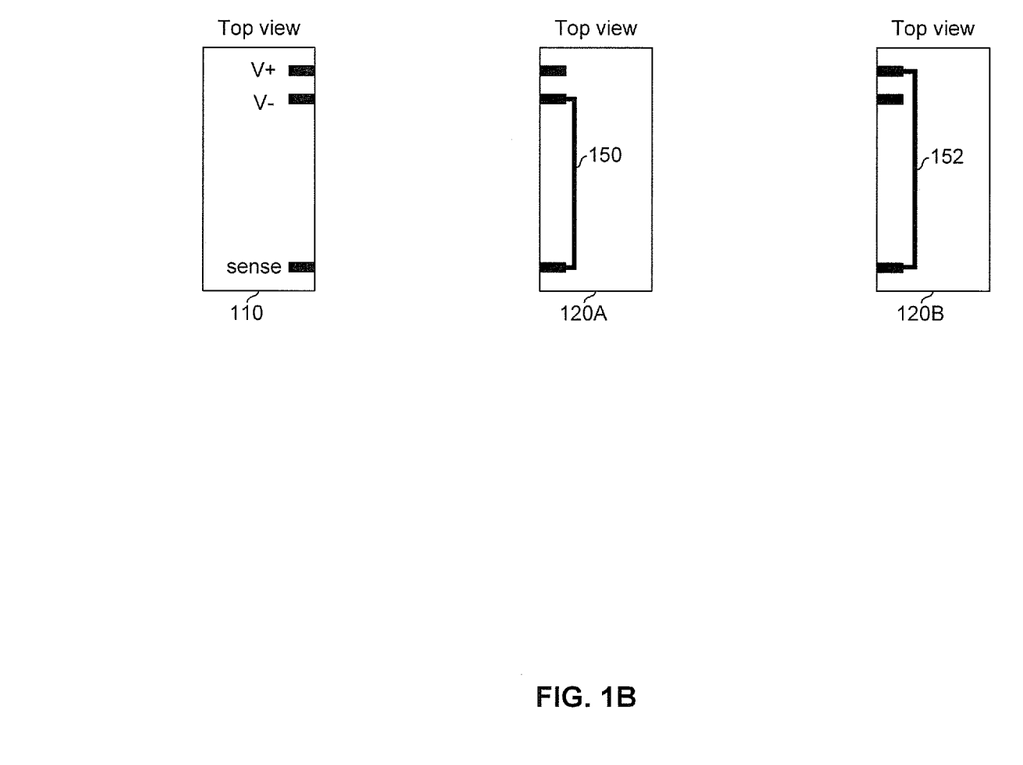
FIG. 1B is a block diagram illustrating connectors which comprise electrical characteristics to indicate whether power is to be sourced or sinked, in accordance with an embodiment of the invention.
Figure 1C:
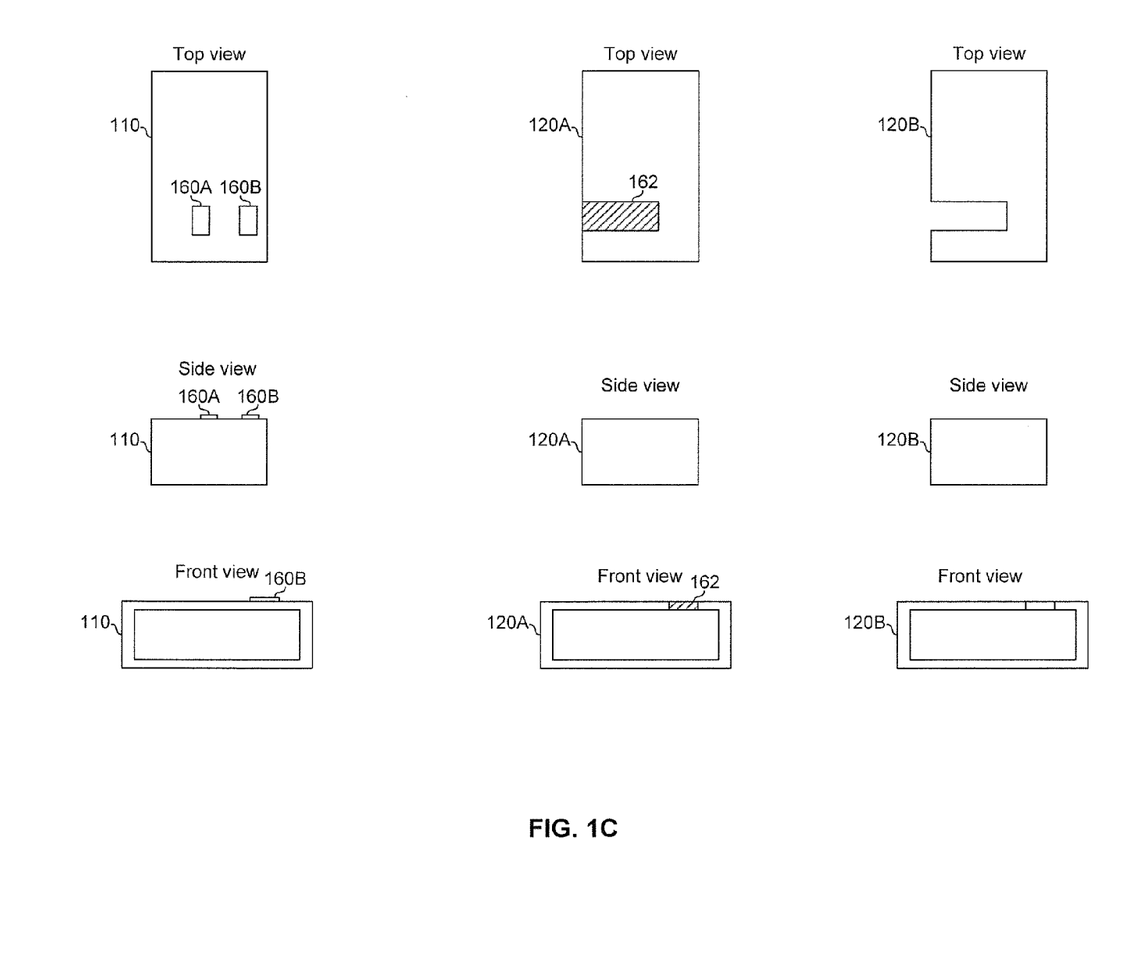
FIG. 1C is a block diagram illustrating connectors which comprise electro-mechanical characteristics to indicate whether power is to be sourced or sinked, in accordance with an embodiment of the invention.

In an exemplary embodiment of the invention, the module 112 may be configured based on, for example, the presence of one or more pins, a voltage on one or more pins, and/or mechanical characteristics of the connector 120 that is mated with the connector 110. The type of pins may refer to the function of the pins. For example, in some instances the connector 110 and/or the connector 120 may comprise sense pins or other pins that indicate a configuration of the connector 110 and/or the connector 120. Also, a first set of electrical and/or mechanical features on a connector 120 may indicate that supply power is to be sourced by the device 102 and a second set of electrical or mechanical features on a connector 120 may indicate that power is to be sinked by the device 102. In this regard, FIG. 1B illustrates a an exemplary embodiment of the invention in which connector 120A comprises a conductor 150 which ties the sense pin to V− to indicate that power is to be sourced, and a connector 120B comprises a conductor 152 which ties the sense pin to V+ to indicate that power is to be sinked. In another embodiment of the invention, shown in FIG. 1C, the connector 110 comprises contacts 160A and 160B, which, when shorted together, may indicate power is to be sourced and when not electrically shorted may indicate power is to be sinked. Accordingly, the connector 120 may comprise a knock-out 162 which may electrically short the contacts 160A and 160B when present and may leave the contacts 160A and 160B open circuited when absent. Accordingly, the connector 120A may indicate power is to be sourced and the connector 120B may indicate that power is to be sinked.

In instances that the networking enabled device 102 provides supply power via the connector 110, the power subsystem 108 may be operable to condition, regulate, and/or otherwise manage or control supply power available via the connector 110. In this regard, supply power available from the power subsystem 108 may be conditioned, regulated, or otherwise managed or controlled based on various indications and/or conditions. In some embodiments of the invention, a value of a sense resistor in a link partner may be detected to determine how to control condition, regulate, and/or otherwise manage or control supply power available and/or provided via the connector 110. In some embodiments of the invention, power classification techniques similar to or the same as those being developed by the IEEE 802.3 at task force—2-Event classification and/or Layer 2 Classification, for example—may be utilized to determine how to control condition, regulate, and/or otherwise manage or control supply power available and/or provided via the connector 110. In some embodiments of the invention, characteristics of the connection system 134 may be utilized to determine how to condition, regulate, or otherwise manage or control supply power available and/or provided via the connector 110. For example, the number of twisted pairs in the cable 133, the presence of the shielding 132, and/or the length of the cable 133 may determine how much current may be delivered via the connector 110. Characteristics of the connection system 134 may, in some instances, be determined utilizing time domain reflectometry and/or other techniques. Additionally or alternatively, the determination of how to condition, regulate, and/or otherwise manage or control the supply power available and/or provided via the connector 110 may be based on an energy management policy implemented in the networking enabled device 102.

In instances that the networking enabled device 102 operates as a powered device (PD), logic, circuitry, interfaces, and/or code of the power subsystem 108 may be operable to draw supply power from a link partner via the connector 110. In this manner, at least a portion of the networking enabled device 102 may operate using supply power drawn via the connector 110. In some embodiments of the invention, the power subsystem 108 may be enabled to indicate a supply power desired and/or required via a variable sense resistor. In some embodiments of the invention, power classification techniques similar to or the same as those being developed by the IEEE 802.3at task force—2-Event classification and/or Layer 2 Classification, for example—may be utilized to indicate supply power desired and/or required. In some embodiments of the invention, characteristics of the connection system 134 may be utilized to determine how much supply power is desired and/or required. Also, in instances that the networking enabled device 102b is operating as a powered device, the power subsystem 108 may be operable to condition, regulate, or otherwise manage or control supply power drawn via the connector 110.

In various embodiments of the invention, the power subsystem 108 may be configured based on the EEN control policy. In this regard, the supply power available and/or drawn via the connector 110 may determine a mode of operation of the networking enabled device 102. For example, in instances that less supply power is available via the connector 110, the networking enabled device 102 may be configured to operate in a low power mode. Additionally or alternatively, a mode of operation of the networking enabled device 102 may determine supply power drawn and/or supplied via the connector 110. For example, in instances that the networking enabled device 102 is configured to operate in a low power mode, the power subsystem 108 may be configured to draw less supply power from a link partner that is operating as power supplying equipment.

Figure 2A:
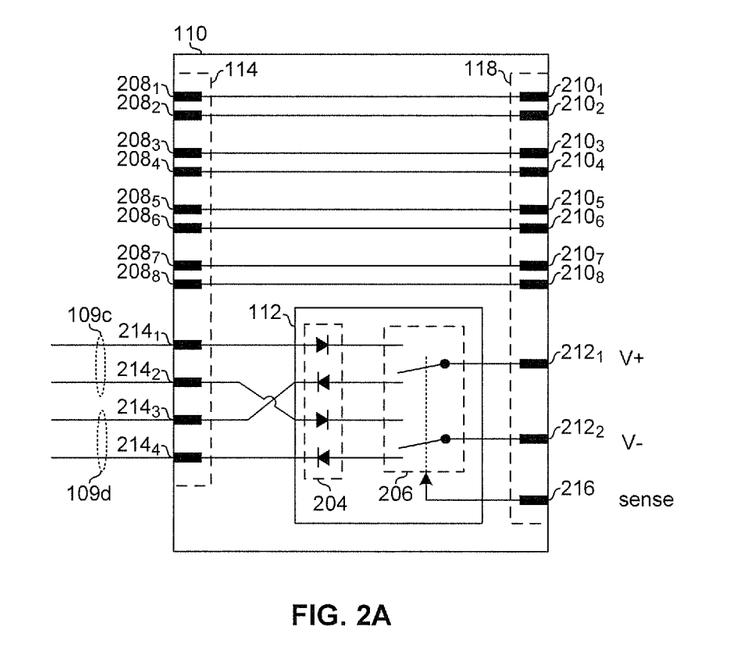
FIG. 2A is a block diagram illustrating an exemplary connector that is configurable to source and sink supply power, in accordance with an embodiment of the invention.

FIG. 2A is a block diagram illustrating an exemplary connector that is configurable to source and sink supply power, in accordance with an embodiment of the invention. Referring to FIG. 2A, there is shown a connector 110 comprising the interface 114, the interface 118, and the module 112.

The interface 114 may comprise a plurality of pins or contacts for coupling to a local system on and/or within which the connector 110 is mounted. In this regard, the interface 114 may be an internal interface of the device 102. In an exemplary embodiment of the invention, the interface 202 may comprise eight data pins $208_1$-$208_8$ for interfacing with traces of the device 102 that carry data signals, and may comprise four power pins $214_1$-$214_4$ for interfacing with the power rail 109c and the power rail 109d.

The interface 118 may comprise a plurality of pins or contacts for coupling to the cable 133. In this regard, the interface 118 may be an external interface of the device 102. In an exemplary embodiment of the invention, the interface 118 may comprise eight data pins $210_1$-$210_8$ for interfacing with four twisted pairs, two power pins $212_1$-$212_2$ for interfacing with conductors 126 in the cable 133 that carry power, and one sense pin 216 which may enable detection of whether power is to be sinked or sourced by the device 102 on and/or within which the connector 110 resides.

The module 112 may comprise a plurality of diodes 204 and a switching element 206. The diodes 204 may ensure that there is not a conflict on one or more power rails. For example, the diodes 204 may protect against supply current from one power source being fed back into an output of another power source. The switching element 206 may be configured based on the voltage on the sense pin 216.

In operation, in instances that the device 102 is to source supply power over the cable 133, the cable 133 may, for example, tie the sense pin 216 to ground. As a result, the switching element 206 may couple the pins $214_1$ to the pin $212_1$ and the pin $214_2$ to the pin $212_2$. Conversely, in instances that the device 102 is to sink supply power from link partner on the other end of the cable 133, the cable 133 may, for example, tie the sense pin 216 to a positive voltage. As a result, the switching element 206 may couple the pins $214_3$ to the pin $212_1$ and the pin $214_4$ to the pin $212_2$.

Figure 2B:
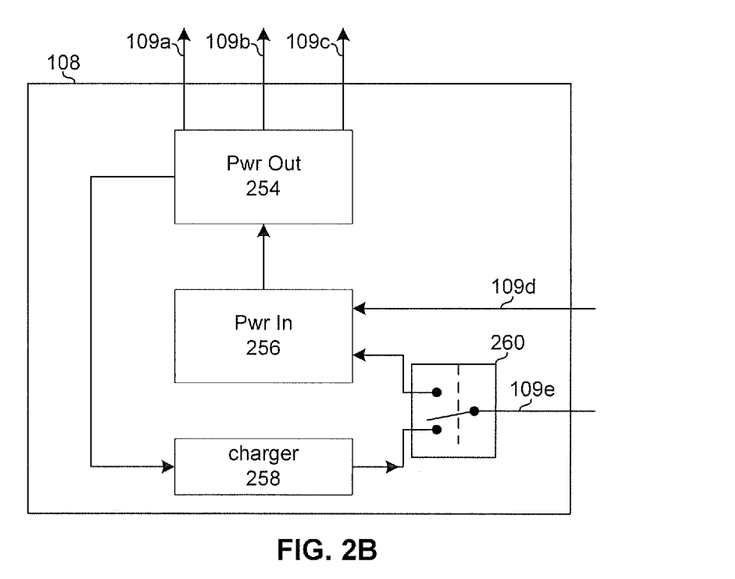
FIG. 2B is a block diagram illustrating a power subsystem operable to interface with one or more connectors configurable to source and sink supply power, in accordance with an embodiment of the invention.

FIG. 2B is a block diagram illustrating a power subsystem operable to interface with one or more connectors configurable to source and sink supply power, in accordance with an embodiment of the invention. Referring to FIG. 2B the power subsystem 108 comprises a power-out module 254, a power-in module 256, a charger 258, and a switching element 260.

The power-in module 256 may comprise suitable logic, circuitry, interfaces, and/or code that may be operable to receive supply power from the connector 110 via the power rail 109d and/or from the local power source 116 via the power rail 109e. The power-in module 256 may be operable to regulate, filter, and/or otherwise condition voltage and/or current input via the power rail 109d and/or the power rail 109e. Also, the power-in module 256 may be operable to detect a voltage on the power rail 109d. and/or measure supply power available via the power rail 109d The power-in module 254 may also be operable to indicate, to a link partner, an amount of supply power desired and/or needed for operation of the device 102.

The power-out module 254 may comprise suitable logic, circuitry, interfaces, and/or code that may be operable to output supply power on the power rails 109a, 109b, and 109c. The power-out module 254 may be operable filter, regulate, and/or otherwise condition voltage and/or current output via the power rails 190a, 109b, and 109c.

The charger 258 may comprise suitable logic, circuitry, interfaces, and/or code that may be operable to regulate, filter, and/or otherwise condition supply power from the power-out module 254 to charge the battery 116 via the power rail 109e. In this regard, supply power received from a link partner via the connector 110 may be utilized to charge the battery.

The switching element 260 may comprise suitable logic, circuitry, interfaces, and/or code that may be configurable such that the power rail 109e may be coupled to the power-in module 256 in a first configuration, coupled to the charger 258 in a second configuration, and disconnected from the power subsystem 108 in a third configuration.

In operation, in instances that the device 102 receives supply power via the connector 110, the received supply power may be conditioned by the power-in module 256 and conveyed to the power-out module 256. The power-out module 254 may regulate and/or otherwise condition the supply power from the power-in module 256 and output the conditioned supply power to the host subsystem 104 via the power rail 109a and to the networking subsystem 106 via the power rail 109b. In instances that the device 102 is operating as a powered device, the power rail 109c may be placed in a high-impedance mode.

In instances that more supply power than is necessary for operation of the device 102 is received via the connector 110, the excess supply power may be utilized to charge the battery 116. In this regard, the switch 260 may be configured to couple the charger 258 to the power rail 109e. In instances that less supply power than is necessary for operation of the device 102 to is received via the power rail 102d, additional supply power may be drawn from the local power source 116. In this regard, the switch 260 may be configured to couple the power-in module to the power rail 109e and the power-in module 256 may be operable to combine the supply power from multiple sources.

In instances when the device 102 supplies power to a remote device to which it is coupled via the connector 110, supply power from the power rail 109e may be conditioned by the power-in module 256 and conveyed to the power-out module 256. The power-out module 254 may be operable to regulate and/or otherwise condition the supply power from the power-in module 256 and output the conditioned supply power to the host subsystem 104 via the power rail 109a, to the networking subsystem 106 via the power rail 109b, and to the connector 110 via the power rail 109d.

In some instances the local power source 116 may be insufficient to power both the device 102 and the remote device coupled via the connector 110. Accordingly, in some embodiments of the invention, the local device 102 may be configured into a low-power mode such that sufficient supply power for the remote device may be provided via the connector 110. For example, portions of the host subsystem 104 and/or the networking subsystem 106 may be powered down.

Figure 3:
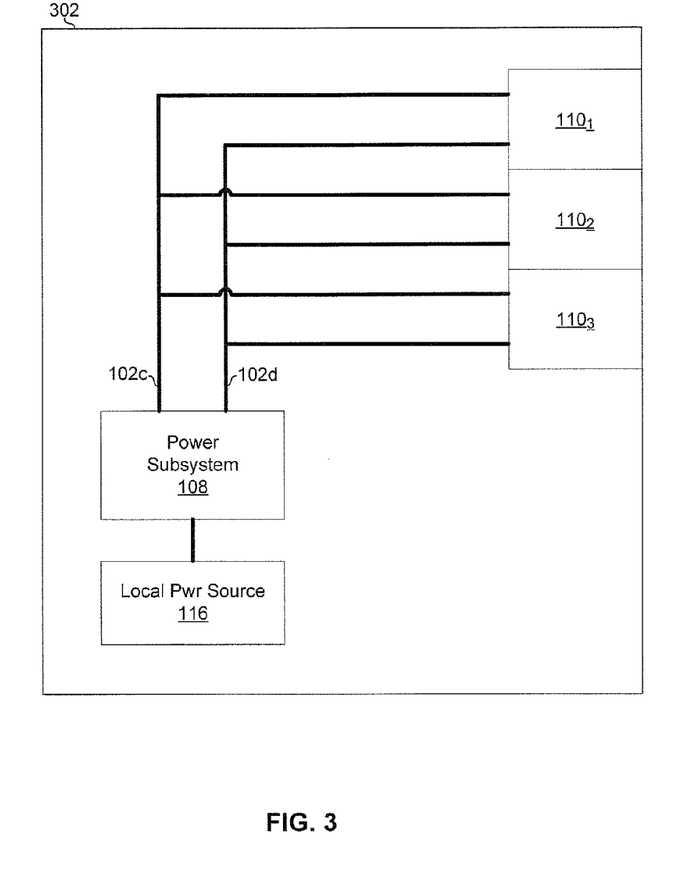
FIG. 3 is a block diagram illustrating an exemplary network device comprising a plurality of connectors via which supply power may be sourced and sinked, in accordance with an embodiment of the invention.

FIG. 3 is a block diagram illustrating an exemplary network device comprising a plurality of connectors via which supply power may be sourced and sinked, in accordance with an embodiment of the invention. Referring to FIG. 3, the networking enabled device 302 may be similar to the networking enabled device 102, which is described with respect to FIG. 1 but may comprise three connectors 110, as opposed to just one. The power subsystem 108 and the local power source 116 may be as described with respect to FIGS. 1, 2A, and 2B.

Figure 4A:
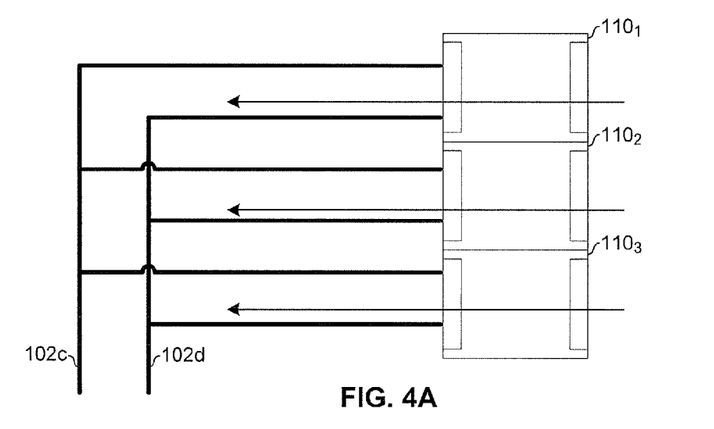
FIGS. 4A-4C are block diagrams that illustrate exemplary configurations of a networking enabled device which comprises a plurality of connectors, in accordance with an embodiment of the invention.
Figure 4B:
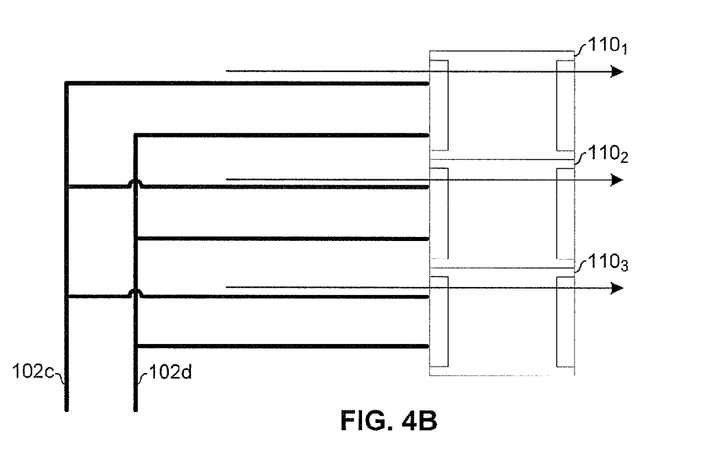
Figure 4C:
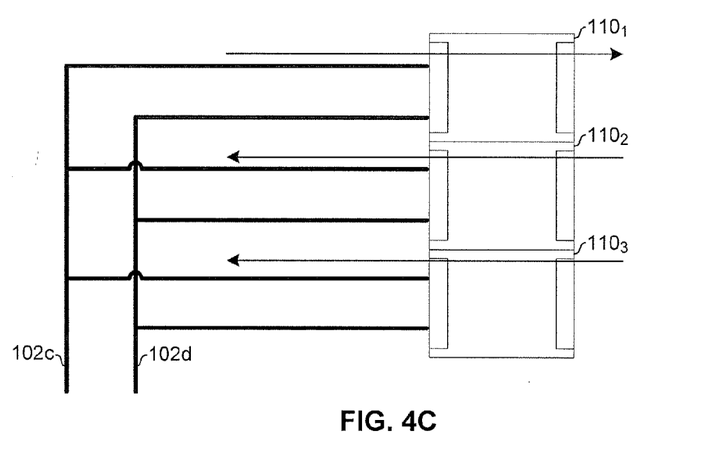

In operation, each of the connectors $110_1$-$110_3$ may be configured for sourcing or sinking supply power independently of the configuration of the other ones of the connectors $110_1$-$110_3$. As a result, any combination of sourcing and sinking supply power via one or more of the connectors $110_1$-$110_3$ may be achieved. In this regard, FIG. 4A illustrates an exemplary configuration in which supply power is sunk concurrently via each of the connectors $110_1$-$110_3$. FIG. 4B illustrates an exemplary configuration in which supply power is concurrently sourced via each of the connectors $110_1$-$110_3$. FIG. 4C illustrates an exemplary configuration in which supply power is concurrently sinked via connectors $110_2$ and $110_3$ and sourced via connector $110_1$.

In an exemplary embodiment of the invention, in a configuration such as the one in FIG. 4C, where one or more of the connectors 1101-1103 sink power and one or more of the connectors 1101-1103 source supply power, various aspects of the invention may enable a pass-through mode where the power subsystem 108 couples the one or more connectors that sink power to the one or more connectors that source power. Such a pass-through mode may enable powering down most of the networking enabled device 102 while still enabling the device 102 to source supply power to one or more link partners.

Figure 5:
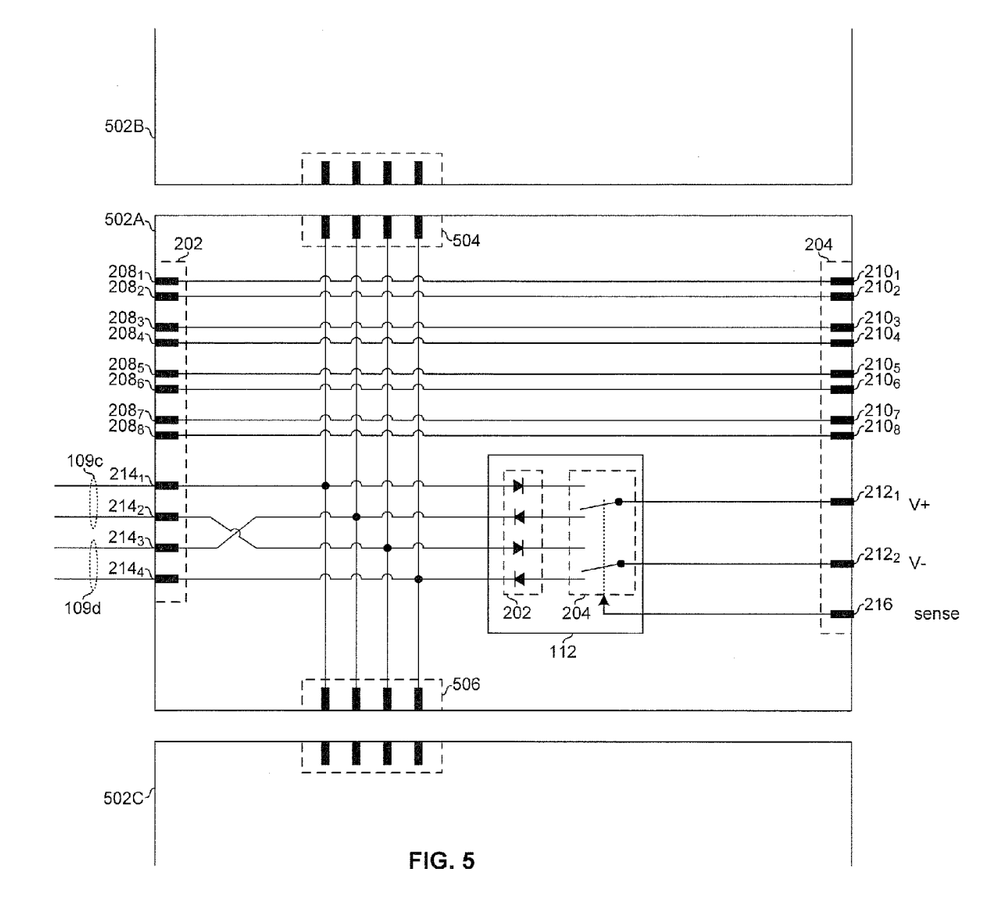
FIG. 5 is a block diagram illustrating an exemplary connector configurable to source and sink supply power and which may be ganged to other connectors such that supply power may be sourced or sinked via the other connectors, in accordance with an embodiment of the invention.

FIG. 5 is a block diagram illustrating an exemplary connector configurable to source and sink supply power and which may be ganged to other connectors such that supply power may be sourced or sinked via the other connectors, in accordance with an embodiment of the invention. Referring to FIG. 5 there is shown a connector 502A similar to the connectors 110 described with respect to FIGS. 1-4C, but additionally comprising interfaces 504 and 506. The interfaces 504 and 506 may each enable coupling the connector 502A to connectors 502B and 502C. In this manner, supply power from the power rail 109c may be routed to the connectors 502B and 502C via the interfaces 504 and 506, and supply power received from link partners by the connectors 502B and 502C may be routed to the power rail 109d via the interfaces 504 and 506. In this regard, the connector 502 may be modular in that additional connectors 502 may be added or removed to the device 102 in which the device 502A resides, with little or no changes and/or reconfiguration of the networking subsystem 106 and/or host subsystem 104.

One advantage of coupling connectors 502 together in this way is that board real estate beneath the connectors may not be needed for traces that run to the connectors and may thus be used for routing other traces. In combination with the integration of components such as magnetics and a PHY, such a modularized connector system may free up a large amount of board real-estate near where the connectors are mounted.

Figure 6A:
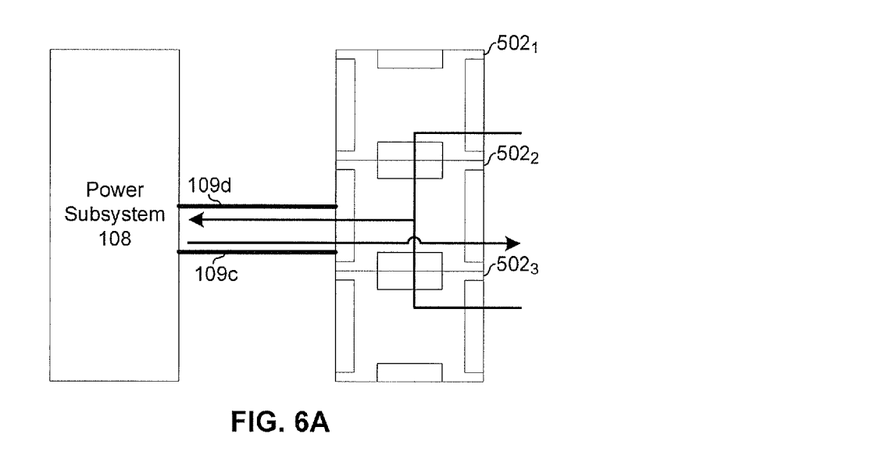
FIGS. 6A-6C are block diagrams that illustrate exemplary configurations of a networking enabled system 102 comprising a plurality of the connectors 502.
Figure 6B:
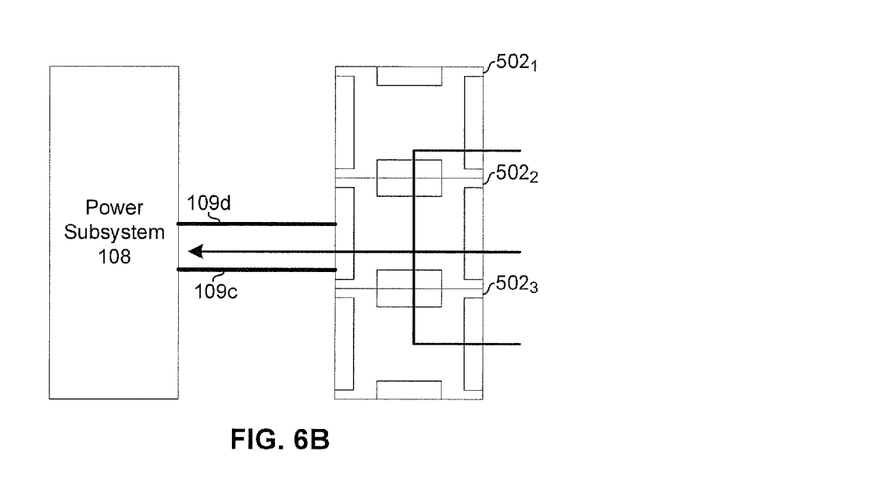
Figure 6C:
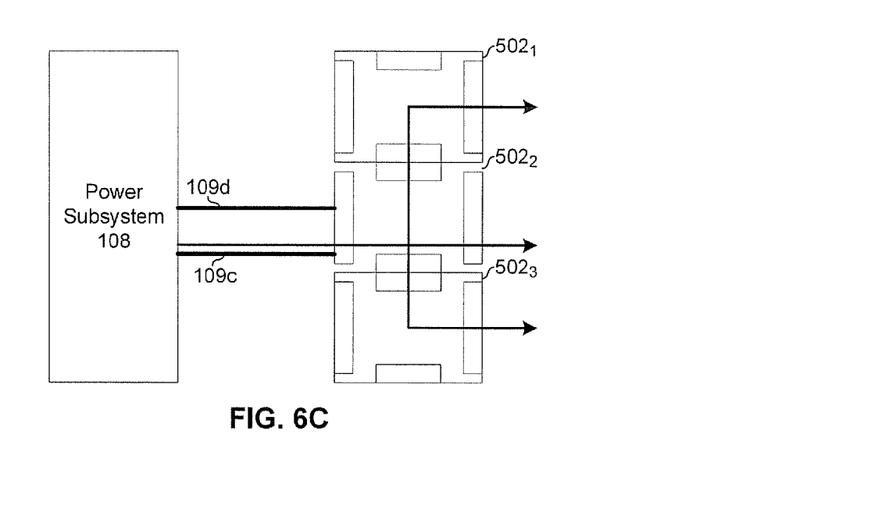

FIGS. 6A-6C are block diagrams that illustrate exemplary configurations of a networking enabled system 102 comprising a plurality of the connectors 502. In FIG. 6A, supply power is sunk via the connectors $502_1$ and $502_3$ and concurrently sourced via the connector $502_2$. In FIG. 6B, supply power is concurrently sinked via each of the connectors $502_1$-$502_3$. In FIG. 6C, supply power is concurrently sourced via each of the connectors $110_1$-$110_3$.

In an exemplary embodiment of the invention, in a configuration such as the one in FIG. 4C, where one or more of the connectors $110_1$-$110_3$ sink supply power and one or more of the connectors $110_1$-$110_3$ source supply power, aspects of the invention may enable a pass-through mode where the power subsystem 108 couples the one or more connectors that sink supply power to the one or more connectors that source supply power. Such a pass-through mode may enable powering down most of the networking enabled device 102 while still enabling the device 102 to source supply power to one or more link partners.

Figure 7:
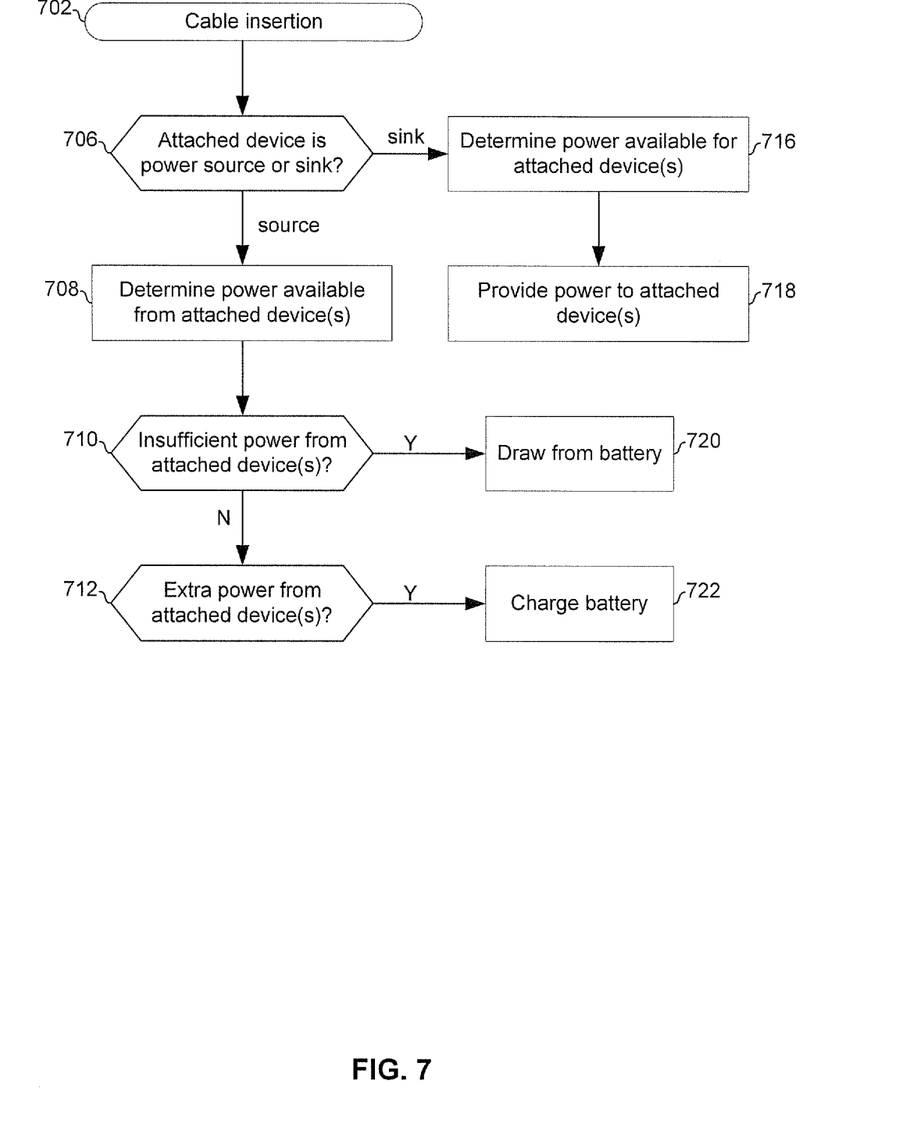
FIG. 7 is a flow chart illustrating exemplary steps for sourcing and/or sinking supply power via a configurable connector, in accordance with an embodiment of the invention.

FIG. 7 is a flow chart illustrating exemplary steps for sourcing and/or sinking supply power via a configurable connector, in accordance with an embodiment of the invention. Referring to FIG. 7, the exemplary steps begin with step 702 when a link partner is attached to the device 102 via a connector 110. In step 706, whether the attached device sources or sinks supply power may be determined and the connector 110 or 502 may be configured accordingly. For example, one or more mechanical features and/or a voltage on a sense pin may configure the switching element 206. In instances that the attached device is operable to sink supply power, the exemplary steps may advance to step 716 in which the device 102 may determine how much supply power it can provide to the attached device and/or how much supply power the attached device requires. In step 718, the network device 102 may output the determined amount of supply power to the attached device via the connector 110.

Returning to step 706, in instances that the attached device is a power source, the exemplary steps may advance to step 708. In step 708, the device 102 may determine how much power is available from the attached device. This may be determined, for example, via communications with the attached device and/or by measuring a voltage drop over a change in load presented by the power subsystem 108. In step 710, in instances that the attached device cannot provide enough power for operation of the network device 102, then the exemplary steps may advance to step 720 and the device 102 may draw additional power from the battery 116.

Returning to step 710, in instances that the attached device provides more power than is required for operation of the device 102, then the exemplary steps may advance to step 722 and the excess or additional power available from the attached device may be utilized to charge the battery 116.

Various aspects of a method and system for a connection system operable to sink and source supply power are provided. In this regard, one or more circuits 112 within and/or on a connector 110 or 502 that resides in a networking enabled device 102 may be operable to determine whether the networking enabled device 102 is to operate as a powered device or as a power supplying device. Based on a result of the determination, the one or more circuits 112 may be operable to couple power pins $212_1$-$212_2$ of the connector 110 or 502 to either a first power rail 109c of the networking enabled device 102 or a second power rail 109d of the networking enabled device 102. The determination of whether the networking enabled device 102 is to operate as a powered device or as a power supplying device may be based on a voltage on a sense pin of the connector. The determination of whether the networking enabled device is to operate as a powered device or as a power supplying device may be based on a mechanical characteristics of the connector. The connector 502 may comprise one or more first interfaces 118 that enable electrically coupling the connector 110 to the cable 133, one or more second interfaces 114 that enable electrically coupling the connector 502 to the networking enabled device 102, and one or more third interfaces 504 and/or 506 that enable electrically coupling the connector 502 to another connector 502 that is mounted on or within the device 102.

The networking enabled device 102 may comprise a plurality of the connectors 110 and/or 502 and each one of the connectors 110 and/or 502 may be configured independent of a configuration of remaining ones of the connectors 110 and/or 502. The networking enabled device 102 may be operable to receive power via a plurality of the connectors 110 and/or 502 concurrently. The networking enabled device 102 may be operable to sink power via one or more of the plurality of connectors 110 and/or 502 while concurrently sourcing power via one or more of the plurality of connectors 110 and/or 502. The networking enabled device 102 may be operable to communicate in adherence with Ethernet protocols via the connector 110 and/or 502. The networking enabled device 102 may be operable to determine a power available via the connector 110 and/or 502. The networking enabled device 102 may comprise a battery that may be charged utilizing supply power received via the connector 110 and/or 502.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for a connection system operable to sink and source supply power.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A network connection system, comprising:
    a networking enabled device configured to operate in a power sinking mode or a power sourcing mode based on an operating mode of a remote device coupled to the networking enabled device via a connector, the connector including a sense pin and first and second power pins, the first and second power pins being configured to transfer power between the networking enabled device and the remote device; and
    a switching module configured to switch a coupling of the first and second power pins between one of a first or a second power rail of the networking enabled device based on whether the sense pin is coupled to the first or the second power pin,
    wherein the first and second power pins are coupled to the first power rail when the sense pin is coupled to the first power pin to allow the networking enabled device to operate in the power sinking mode, and
    wherein the first and second power pins are coupled to the second power rail when the sense pin is coupled to the second power pin to allow the networking enabled device to operate in the power sourcing mode.

2. The network connection system according to claim 1, wherein the connector is further configured to couple the first and second power pins to the first or second power rails based on a voltage on the sense pin.

3. The network connection system according to claim 1, wherein the networking enabled device is further configured to be coupled to the remote device via the connector and a mating connector, and wherein the connector is further configured to couple the first and second power pins to the first or second power rails based on a mechanical characteristic of the mating connector.

4. The network connection system according to claim 3, wherein the connector includes a first and a second contact, and
    wherein the mechanical characteristic of the mating connector is a knock-out configured to short the first and second contacts together when present, and to leave the first and second contacts open circuited when absent.

5. The network connection system according to claim 1, wherein the connector comprises:
    a first interface configured to electrically couple the connector to a cable;
    a second interface configured to electrically couple the connector to the networking enabled device; and
    a third interface configured to electrically couple the connector to another connector, the another connector being coupled to the networking enabled device.

6. The network connection system according to 1, wherein the connector is from among a plurality of connectors, each connector from among the plurality of connectors being coupled to another corresponding remote device from among a plurality of remote devices.

7. The network connection system according to claim 6, wherein each connector from among the plurality of connectors is further configured to enable the networking enabled device to sink power separately and concurrently from the plurality of remote devices.

8. The network connection system according to claim 6, wherein each connector from among the plurality of connectors is configured to enable the networking enabled device to sink power from each corresponding remote device from among the plurality of remote devices to the networking enabled device.

9. The network connection system according to claim 6, wherein each connector from among the plurality of connectors is configured to enable the networking enabled device to source power to each corresponding remote device from among the plurality of remote devices.

10. The networking connection system according to claim 1, wherein the networking enabled device is further configured to communicate with the remote device in accordance with an Ethernet protocol.

11. The networking connection system according to claim 1, wherein the networking enabled device is further configured to determine a power available to source to the remote device or to sink from the remote device.

12. The network connection system according to claim 1, wherein the networking enabled device is coupled to the remote device via the connector and a first or a second mating connector,
    wherein the first mating connector is configured to couple the sense pin to the first power pin, and
    wherein the second mating connector is configured to couple the sense pin to the second power pin.

13. The network connection system according to claim 12, wherein the first and second power pins are coupled to a positive voltage source and a ground, respectively.

14. The network connection system according to claim 1, wherein the first and second power rails include a sinking pair of power lines and a sourcing pair of power lines, respectively, and wherein the connector comprises:
    a sinking and a sourcing pair of power pins coupled to the sinking and sourcing power lines, respectively.

15. The network connection system according to claim 14, wherein the first and second power pins comprise:
    a switched pair of power pins.

16. The network connection system according to claim 15, wherein the switching module comprises:
    a double-pole-double-throw (DPDT) switch configured to couple the switched pair of power pins to the sinking pair of power pins in a first state, and to couple the switched pair of power pins to the sourcing pair of power pins in a second state.

17. The network connection system according to claim 16, wherein the DPDT switch is further configured to switch between the first and second states based on a voltage on the sense pin.

18. The network connection system according to claim 16, wherein the switching module further comprises:
   a plurality of diodes coupled between the switched pair of power pins and the sinking and sourcing pair of power pins.

19. The network connection system according to claim 1, wherein the networking enabled device is further configured to support wireless communications, and wherein the connector is further configured as an antenna port.

20. The network connection system according to claim 1, wherein the networking enabled device is configured to be coupled to the remote device via the connector and a mating connector, and wherein the connector and the mating connector are keyed to mate with one another in only one mating configuration.

* * * * *

UNITED STATES PATENT AND TRADEMARK OFFICE
CERTIFICATE OF CORRECTION

| | | |
|---|---|---|
| PATENT NO. | : 8,791,604 B2 | Page 1 of 1 |
| APPLICATION NO. | : 12/828484 | |
| DATED | : July 29, 2014 | |
| INVENTOR(S) | : Diab et al. | |

It is certified that error appears in the above-identified patent and that said Letters Patent is hereby corrected as shown below:

Title Page:

Please delete all information in item (60) Related U.S. Applications.

Signed and Sealed this
Twenty-fifth Day of November, 2014

Michelle K. Lee
*Deputy Director of the United States Patent and Trademark Office*